United States Patent
Delmas et al.

(10) Patent No.: US 11,528,658 B2
(45) Date of Patent: Dec. 13, 2022

(54) METHOD FOR OBTAINING A DATA SEGMENT BY A CLIENT DEVICE CAPABLE OF COMMUNICATING WITH A PLURALITY OF CONTENT DELIVERY NETWORKS

(71) Applicant: STREAMROOT, Arcueil (FR)

(72) Inventors: Axel Delmas, Paris (FR); Paul-Louis Ageneau, Paris (FR)

(73) Assignee: Streamroot, Paris (FR)

( * ) Notice: Subject to any disclaimer, the term of this patent is extended or adjusted under 35 U.S.C. 154(b) by 81 days.

(21) Appl. No.: 16/825,809

(22) Filed: Mar. 20, 2020

(65) Prior Publication Data

US 2020/0305070 A1    Sep. 24, 2020

(30) Foreign Application Priority Data

Mar. 22, 2019    (FR) ...................................... 1902989

(51) Int. Cl.
*H04W 48/18* (2009.01)
*H04L 43/0882* (2022.01)
(Continued)

(52) U.S. Cl.
CPC ......... *H04W 48/18* (2013.01); *H04L 43/0882* (2013.01); *H04L 65/61* (2022.05); *H04W 24/08* (2013.01)

(58) Field of Classification Search
CPC ............. H04L 43/0882; H04L 65/4069; H04L 67/1002; H04L 67/2842; H04L 65/61; H04W 24/08; H04W 48/18
See application file for complete search history.

(56) References Cited

U.S. PATENT DOCUMENTS 9,160,641 B2 * 10/2015 Baumback .............. H04L 43/06
9,787,745 B1 * 10/2017 Binns .................... H04L 65/611
(Continued)

FOREIGN PATENT DOCUMENTS

WO    2010/045511 A2    4/2010

OTHER PUBLICATIONS

International Search Report and Written Opinion received for PCT Patent Application No. PCT/EP2020/057862, dated May 12, 2020, 13 pages of Original Document Only.
(Continued)

*Primary Examiner* — Shah M Rahman (57) ABSTRACT

There is proposed a method for obtaining a data segment by a client device capable of communicating with a plurality of content delivery networks (CDN1, CDN2), the method comprising the following steps: for each network of the plurality of networks, calculating (100) a score associated with the network indicative of a quality of transmission of data from the network to the client device; randomly drawing (102) a network in the plurality of networks, the random draw being adapted so that a probability of drawing a network of the plurality associated with a score indicative of a first quality of transmission is higher than a probability of drawing a network of the plurality associated with a score indicative of a second quality of transmission lower than the first quality of transmission; and requiring (104) the drawn network for the client device to obtain the data segment from the drawn network.

19 Claims, 1 Drawing Sheet

(51) Int. Cl.
*H04W 24/08* (2009.01)
*H04L 65/61* (2022.01)

(56) References Cited

U.S. PATENT DOCUMENTS

| | | | | |
|---|---|---|---|---|
| 10,630,990 | B1* | 4/2020 | Saxton | H04N 19/166 |
| 2003/0229682 | A1 | 12/2003 | Day | |
| 2005/0256677 | A1* | 11/2005 | Hayes | G06F 11/3452 702/179 |
| 2010/0094967 | A1* | 4/2010 | Zuckerman | H04L 67/1002 709/219 |
| 2010/0094986 | A1* | 4/2010 | Zuckerman | H04L 67/1097 709/223 |
| 2012/0265837 | A1* | 10/2012 | Grant | H04L 67/025 709/212 |
| 2014/0181285 | A1* | 6/2014 | Stevens | H04L 67/02 709/223 |
| 2015/0020135 | A1* | 1/2015 | Frusina | H04N 21/2405 725/116 |
| 2015/0341812 | A1* | 11/2015 | Dion | H04N 21/2404 370/252 |
| 2016/0088322 | A1* | 3/2016 | Horev | H04N 21/23418 725/14 |
| 2016/0248835 | A1* | 8/2016 | Petrangeli | H04L 65/65 |
| 2016/0366202 | A1* | 12/2016 | Phillips | H04N 21/26258 |
| 2017/0188072 | A1* | 6/2017 | Major | H04N 21/6582 |
| 2017/0255875 | A1* | 9/2017 | Chien | G06N 7/005 |
| 2017/0374594 | A1* | 12/2017 | Khawam | H04W 36/30 |
| 2018/0013516 | A1* | 1/2018 | Zoellner | H04L 1/1819 |
| 2018/0131620 | A1* | 5/2018 | Su | H04L 47/2441 |
| 2018/0139254 | A1* | 5/2018 | Oyman | H04L 67/2842 |
| 2018/0198694 | A1* | 7/2018 | Wells | H04L 67/1021 |
| 2018/0211554 | A1* | 7/2018 | Corbin, II | G09B 7/07 |
| 2019/0007286 | A1* | 1/2019 | Klemetsson | H04W 24/08 |
| 2019/0141113 | A1* | 5/2019 | Ganapathi | G06N 20/00 |
| 2019/0155672 | A1* | 5/2019 | Wang | G06K 9/6284 |
| 2019/0238940 | A1* | 8/2019 | Rhoads | H04N 21/458 |
| 2019/0261243 | A1* | 8/2019 | Amini | H04N 19/103 |
| 2019/0304321 | A1* | 10/2019 | Kortan | G09B 7/02 |
| 2019/0364492 | A1* | 11/2019 | Azizi | H04W 52/0261 |
| 2019/0386912 | A1* | 12/2019 | Huang | H04L 41/0668 |
| 2020/0015121 | A1* | 1/2020 | Misra | H04W 28/06 |
| 2020/0304555 | A1* | 9/2020 | Wu | H04L 47/24 |

OTHER PUBLICATIONS

Preliminary Research Report received for French Application No. 1902989, dated Nov. 5, 2019, 5 pages (1 page of French Translation Cover Sheet and 4 pages of original document).

\* cited by examiner

METHOD FOR OBTAINING A DATA SEGMENT BY A CLIENT DEVICE CAPABLE OF COMMUNICATING WITH A PLURALITY OF CONTENT DELIVERY NETWORKS

FIELD OF THE INVENTION

The present invention relates to a method for obtaining a data segment by a client device capable of communicating with a plurality of content delivery networks.

The invention advantageously (but not exclusively) finds application within the context of the playback of a multimedia stream comprising such data segments.

STATE OF THE ART

In a known manner, a content delivery network (abbreviated as CDN below) comprises one or more network-connected servers through the Internet and which cooperate in order to make content or data available to client devices owned by users.

The same data segment may be available from several competing CDNs. In other words, a client device can have the choice between several CDNs to obtain this data segment.

It could be envisaged to select, among the various available CDNs, the CDN offering the best quality of transmission of content to the client device.

If this approach is interesting in the short term, it is much less interesting in the medium to long term. Indeed, the quality of transmission offered by a CDN is likely to vary greatly over time, so that a CDN considered to be optimal in terms of quality of transmission at a given moment may become sub-optimal at a subsequent moment.

DISCLOSURE OF THE INVENTION

The invention aims at allowing a client device to choose a CDN from which to obtain a data segment among several available CDNs, taking into account the conditions for transmitting data between these CDNs and the client device, but in a more flexible manner than with the approach mentioned in the introduction.

There is therefore proposed, according to a first aspect of the invention, a method for obtaining a data segment by a client device capable of communicating with a plurality of content delivery networks, the method comprising steps of:
  for each network of the plurality of networks, calculating a score associated with the network indicative of a quality of transmission of data from the network to the client device,
  randomly drawing a network in the plurality of networks, the random draw being adapted so that a probability of drawing a network of the plurality associated with a score indicative of a first quality of transmission is higher than a probability of drawing a network of the plurality associated with a score indicative of a second quality of transmission lower than the first quality of transmission,
  requiring the drawn network for the client device to obtain the data segment from the drawn network.

The method according to the first aspect of the invention may also comprise the following characteristics or steps, taken alone or combined together when this is technically possible.

The random draw can depend on an exploration parameter, the random draw being then adapted to:

increase the probability of drawing the network associated with the highest score among all the scores calculated relative to the probabilities of drawing the other networks of the plurality, when the value of the exploration parameter varies in a first direction, and/or decrease the probability of drawing the network associated with the highest score among all the scores calculated relative to the probabilities of drawing the other networks of the plurality, when the value of the exploration parameter varies in a second direction opposite to the first direction.

The method may further comprise steps of assessing a risk of deterioration of the conditions for processing, by the client device, a set of data comprising the data segment, such as conditions for playing, by the client device, a multimedia stream comprising the data segment, modifying the value of the exploration parameter according to the assessed risk of deterioration.

At least two networks of the plurality, even all the networks of the plurality, preferably have non-zero probabilities of being drawn.

The score calculation, random drawing, and requirement steps are preferably repeated for several data segments belonging to a set of data such as a multimedia stream or a file.

Preferably, the data segment belongs to a set of data, and the scores are initialized to initial values before the device obtains any segment of the set of data.

For example, the initial value of the score of a network of the plurality is determined based on information indicative of a quality of transmission of data segments from the same network to at least a third-party device different from the client device.

This information is for example provided to the client device by an aggregation server capable of communicating with each third-party device.

If a first network of the plurality has already been required by the client device to obtain at least one data segment belonging to the set of data from the initialization, the score of this first network is preferably updated by taking into account the effective quality of transmission of at least one segment transmitted by the first network to the client device.

If, moreover, a second network of the plurality has not yet been required by the client device to obtain a data segment belonging to the set of data from the initialization, the score of this second network is preferably updated by taking into account the value of the score of the first network.

The method may comprise the calculation of a bandwidth heuristic indicative of a bandwidth available for the transmission of data segments by a network of the plurality to the client device, the score associated with this network depending on the calculated bandwidth heuristic.

Alternatively or additionally, the method may comprise the calculation of a transmission error heuristic associated with a network of the plurality, the transmission error heuristic being indicative of errors in the transmission of data segments having previously been requested by the client device from the network, the score associated with this network depending on the calculated transmission error heuristic.

Preferably, the transmission error heuristic associated with a network of the plurality varies so as to decrease the probability of the random draw of the network, when the network fails to transmit a data segment to the client device.

Preferably, the transmission error heuristic associated with a network of the plurality varies by an amount which in turn increases with a number of past errors in the transmission of segments associated with this network.

Preferably, the transmission error heuristic associated with a network varies so as to enhance the probability of the random draw of the network, when the network succeeds in transmitting a data segment to the client device.

Preferably, the transmission error heuristic of a network varies so as to enhance the probability of the random draw of the network, when no data segment is transmitted from the network to the client device within a predetermined period of time.

The score associated with a network can further depend on a predefined weight specific to this network, this weight being for example a constant.

There is also proposed, according to a second aspect of the invention, a method for playing, by a client device, a multimedia stream comprising a plurality of data segments, the method comprising obtaining at least one of the data segments by means of the method according to the first aspect of the invention.

There is also proposed, according to a third aspect of the invention, a computer program product comprising program code instructions for executing the steps of the method according to the first aspect or to the second aspect of the invention, when this program is executed by a client device.

There is also proposed, according to a fourth aspect of the invention, a medium readable by a client device on which is stored a computer program comprising program code instructions for executing the steps of the method according to the first aspect or to the second aspect of the invention.

There is also proposed, according to a fifth aspect of the invention, a client device intended to obtain a data segment, the client device comprising a communication interface for communicating with a plurality of content delivery networks, and a processing unit configured to control the implementation of the steps of the method according to the first aspect or according to the second aspect of the invention.

DESCRIPTION OF THE FIGURES

Other characteristics, objects and advantages of the invention will emerge from the following description, which is purely illustrative and not limiting, and which should be read in relation to the appended drawings in which.

In all the figures, the similar elements bear identical references.

DETAILED DESCRIPTION OF THE INVENTION

Figure 1:
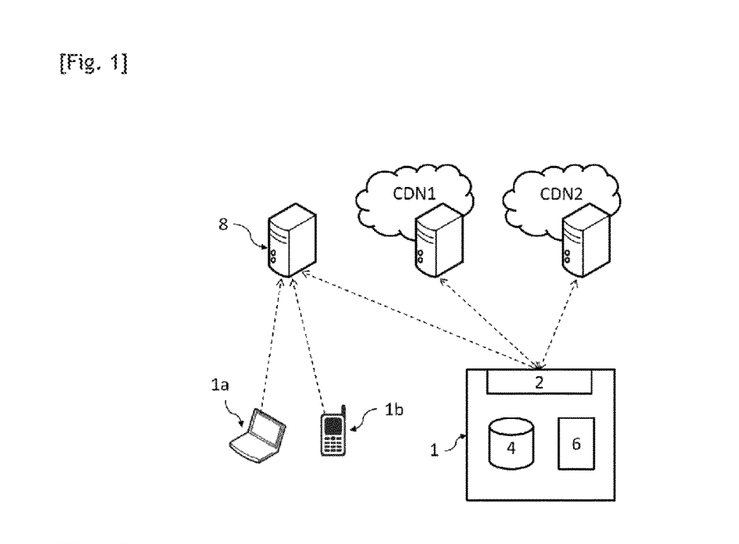
FIG. 1 schematically represents a client device according to one embodiment of the invention and several content delivery networks.

FIG. 1 represents a client device 1 capable of communicating with a plurality of content delivery networks (CDNs). Only two CDNs referenced CDN1 and CDN2 are represented in this figure, but more generally a set of N CDNs indexed from 1 to N will be considered below.

As diagrammatically indicated in FIG. 1, each CDN comprises at least one server, it being understood that these CDNs can comprise more than a single server, as mentioned in the introduction.

Each CDN stores data segments belonging to the same set of data. For example, all CDNs comprise the complete set of data, that is to say all segments of this set of data.

The set of data can be a data file, intended to be referenced in a file system for access to this file. Alternatively, the set of data is a multimedia stream being in the form of one or several files.

The segments of the considered set of data are ordered together. In the case of a file-type set of data, the segments correspond to different portions of the binary forming the file, each portion having a relative address (offset) specific thereto relative to the start address of the file.

The segments of a multimedia stream are temporally ordered: each segment is associated with or comprises a timestamp specific thereto. The different timestamps make it possible to determine in which order the different segments of the multimedia stream should be played by a player.

In the particular case of a live multimedia stream and more generally of a DVR stream, only a time window corresponding to the last N minutes, or last M hours, is available on the content networks. In this case, by set of data is meant the collection of the multimedia data which form this time window. When a new video segment is generated by a live encoder, it is added to the set of data while the oldest segment expires and is removed from the set of data.

Whatever form taken by the set of data, it is considered in the present text that a data segment designates a portion of the set of data which is likely to be transmitted to the client device 1 independently of the other data segments of the same set of data.

The client device 1 also comprises a communication interface 2 for communicating with the various CDNs, and in particular receiving from these CDNs segments of the set of data.

The client device 1 also comprises a memory 4 for storing segments received via the communication interface 2, and a processing unit 6 configured to process the data segments contained in the memory 4.

The processing unit 6 comprises for example at least one processor configured to execute a computer program comprising code instructions implementing this processing.

In the case where the set of data is a multimedia stream, the processing unit 6 comprises a player configured to play the data segments. Conventionally, such a player comprises a decoder configured to decode the segments, and an output arranged at the output of the decoder for rendering a content of segments, such as a display screen in the case of a video segment, or a speaker in the case of an audio segment.

In the case where the set of data is a file, the processing unit 6 is configured to assemble the different segments which form this file once they are received, so as to form a copy of the file referenced in a system of files of the client device 1.

The processing unit 6 is also configured to select from the various CDNs a CDN to be required in order to obtain a data segment to be processed. This selection is for example implemented in the computer program comprising code instructions implementing the subsequent processing of these segments, or implemented in a separate selection program.

The client device 1 is aware of the different CDNs to which it can access. For example, addresses of these CDNs are for example stored in the memory 4 of the client device 1.

FIG. 1 also represents an aggregation server 8 with which the client device 1 is able to communicate. The aggregation server comprises a memory and a processing unit configured to apply calculations to data it receives from the client device 1 as well as other client devices 1a, 1b, which will be referred to as third-party devices in contrast to the client device 1.

The devices 1a and 1b are configured in the same way as the device 1.

Any of the devices 1, 1a, 1b can be, for example, in the form of a desktop computer, a television, a laptop, a tablet, a smartphone, etc.

A method for processing the set of data previously discussed by the client device 1 will now be described.

Figure 2:
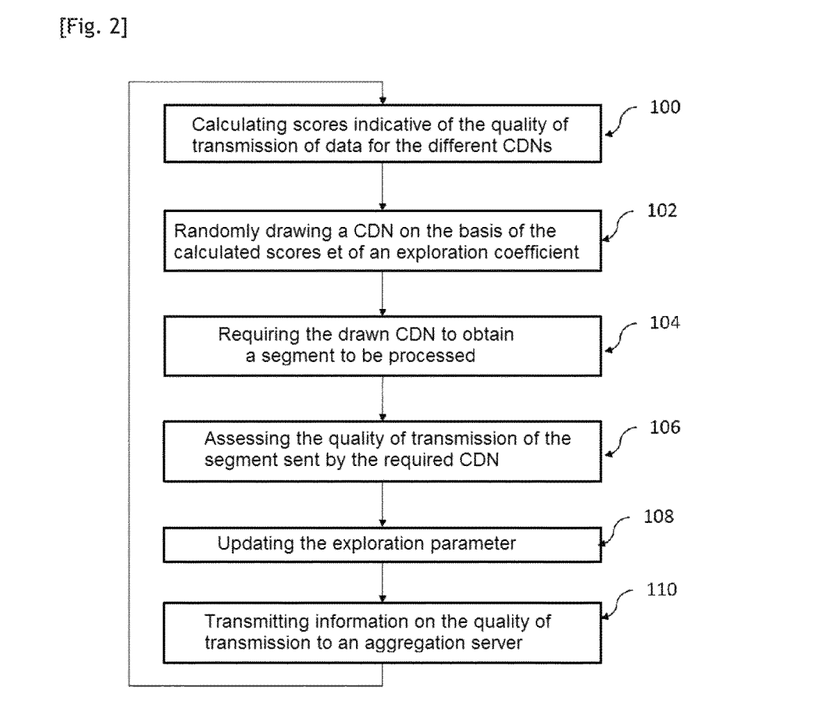
FIG. 2 is a flow diagram of steps of a method for obtaining a data segment according to one embodiment of the invention.

Referring to FIG. 2, the following steps are implemented for a segment of the set of data to be processed.

For all i ranging from 1 to N, the processing unit 6 calculates a score $x_i$ associated with the CDN of index i. The score $x_i$ is indicative of a quality of transmission of data from the CDN of index i to the client device 1 (step 100). This calculation 100 will be more fully detailed below.

Although the opposite could be envisaged, an embodiment is detailed below in which the value of a score $x_i$ increases with the quality of transmission of data from this CDN to the client device 1. In other words, a score of 10 indicates a quality of transmission of data higher than a score of 5 for example.

The processing unit 6 implements a random draw of a CDN among the different CDNs (step 102).

In the following, $P_i$ represents the probability of drawing the CDN of index i among the N CDNs available via this random draw 102.

The random draw 102 is adapted so that the probability of drawing a CDN associated with a score indicative of a relatively high quality of transmission is higher than the probability of drawing a CDN associated with a score indicative of a relatively low quality of transmission.

This random draw 102 is moreover such that at least two of the N CDNs, even all of the CDNs, have non-zero probabilities of being drawn.

In the case where the value of a score $x_i$ increases with the quality of transmission of data from this CDN to the client device 1, the above property of the random draw is expressed in the following manner:

$$\forall (i,j) \in [\![1,N]\!]\ x_i > x_j \Rightarrow P_i > P_j$$

In practice, the random drawing step 102 can comprise the following sub-steps.

The processing unit 6 calculates the drawing probabilities $P_j$ associated with the scores $x_j$.

The processing unit 6 then implements a uniform random draw of a number in an interval whose length is equal to the sum of the probabilities $P_j$. This interval is the union of N distinct sub-intervals respectively associated with the different CDNs. For any j ranging from 1 to N, the sub-interval associated with the CDN of index j is of length equal to the probability $P_j$.

The CDN randomly drawn during step 102 is the CDN associated with the sub-interval including the drawn number.

The random draw 102 preferably depends on a parameter C, called exploration parameter. The random draw is adapted to increase the probability of drawing the network associated with the highest score among all the scores calculated relative to the probabilities of drawing the other networks of the plurality, when the value of the exploration parameter varies in a first direction, and/or decrease the probability of drawing the network associated with the highest score among all the scores calculated relative to the probabilities of drawing the other networks of the plurality, when the value of the exploration parameter varies in a second direction opposite to the first direction.

For example, the probability $P_j$ of drawing a CDN of index j among the available N CDNs is of the following form:

$$P_j = \frac{x_j^C}{\sum x_i^C}$$

Using the parameter C is advantageous because it allows adjusting the more or less exploratory nature of the random draw (hence its name "exploration" parameter). When the above formula is used, if the value of the parameter C is high, the random draw 102 will tend to favor a draw of the CDN considered to be of maximum quality to the detriment of the other CDNs. With a C of lower value, such an advantage will have less weight, so that suboptimal CDNs in terms of quality of transmission will be more likely to be drawn during step 102.

The exploration parameter C can be fixed, but can also be adjusted dynamically (the case of such a dynamic adjustment is detailed below).

The network having been randomly drawn is then required by the client device 1 so that the client device 1 obtains a segment of the set of data (step 104).

This requirement 104 comprises for example the emission by the client device 1 via the communication interface 2 of a segment request intended for the drawn CDN, and the transmission by the drawn CDN of the segment targeted by the request, in response thereto.

A requirement 104 from the drawn CDN by the client device can result in a success or a failure. Indeed, errors can occur during this requirement: the request may not reach the drawn CDN; the drawn CDN may not emit the requested segment at all due to an internal bug; Finally, the drawn CDN can emit the segment requested by the client device 1, but this segment may not be correctly transmitted to the client device 1.

If the segment is not received by the client device 1, then the client device 1 can repeat the requirement step 104 until obtaining the data segment. However, it is preferable not to immediately repeat such a requirement: in the following, attention will be paid to this embodiment.

If the segment is well received by the client device during this requirement step 104, the segment is stored in the memory 4 with a view to being processed by the processing unit 6. For example, in the case where the data segment that has just been received is part of a multimedia stream to be played, the processing unit 6 can control the playback of the data segment by a player (the processing of the segment is a playback).

In the case where the data segment is part of a file to be referenced in a file system, the processing unit 6 checks whether all the segments forming the file have been received. If so, the processing unit 6 assembles all the segments so as to reconstruct a copy of the file and the reference in a file system. Otherwise, the unit waits for other data segments of the file.

Furthermore, the processing unit 6 assesses the effective quality of the transmission of the segment which has been received from the CDN previously drawn randomly (step 106).

This assessment may comprise the calculation of a bandwidth heuristic indicative of a bandwidth available for the transmission of data from the drawn CDN to the client device 1.

Typically, the pass band heuristic depends on an instantaneous bandwidth made available to the client device 1 in order to obtain the segment of the CDN drawn during step 104. This instantaneous bandwidth is typically calculated in the form of a ratio between the duration taken to obtain the segment and the size of this segment.

It was seen previously that the requirement 104 of the drawn CDN can result in a success (a data segment is obtained by the client device 1) or in a failure (the client device 1 does not receive the data segment). Also, the assessment of the effective quality of the transmission of the segment can comprise the calculation of a transmission error heuristic, this transmission heuristic being indicative of errors in the transmission of data segments having been previously requested by the client device to the network (in particular the segment that the client device requested from the drawn CDN, during the requirement step 104).

Such transmission errors can in practice be measured by the client device 1 at a session layer (typically HTTP) or at a higher-level layer in the OSI model, such as an application layer.

These errors can be of various kinds: error 404 (or 40X or 50X), timeout error (the segment was not obtained in the allotted time given by a download module http of the client device 1), temporary network disconnection of the client device 1, error on the HTTPS handshake, error related to the browser security (CORS, mixed content HTTP/HTTPS), etc.

Each calculated heuristic is stored in the memory 4 of the client device 1.

Furthermore, if the draw probabilities discussed above depend on the exploration parameter C, the processing unit 6 can assess a risk of deterioration of the conditions for processing, by the client device 1, the set of data comprising the data segment, and modify the value of the exploration parameter C according to the assessed risk of deterioration (step 108).

These processing conditions are for example conditions for playing the data segment by the client device 1 when this set is a multimedia stream to be played, Concretely, the assessment of the risk of deterioration of the conditions for playing the multimedia stream to be played implemented during step 108 can take into account the change in the filling rate of a buffer upstream of the player of the client device 1. Indeed, such a filling rate can indicate whether the playback of the stream may or may not stop if the CDN drawn during step 102 is not of optimal quality and the download of a segment from this drawn CDN takes longer than expected (this interruption typically occurring when the player needs to process a new segment but with the buffer empty).

If, for example, it has been detected that there is a high risk of deterioration of these processing conditions, it may be preferable for safety reasons to make the draw less exploratory by varying the value of C. In the absence of risk or at a lower risk of deterioration, it can be allowed to require CDNs other than the one considered of better quality; in other words, the value of C can be modified in this case to make the draw more exploratory.

Another way to assess the risk of deterioration of the conditions for processing the set of data is to consult the results obtained during step 106. Typically, if the transmission of the segment that the device has requested from the drawn CDN during step 104 has failed, the risk increases.

Steps 100, 102, 104, 106, 108 represented in FIG. 2 form an iteration of the method. Several iterations of the method are implemented over time, each iteration being aimed at obtaining and processing a new segment of the set of data. For example, a new iteration is implemented for each new segment that the client device 1 must obtain and process.

Given the probabilistic nature of the selection of a CDN to obtain a segment of the set of data, it is almost certain that several CDNs will be required by the client device 1 before or during the processing of the set of data, especially if the number of segments of this set is significant.

Particularly, when the client device 1 does not obtain a data segment from a CDN drawn during an implementation of the step of requiring 104 an iteration, a new random draw is implemented during step 102 of a next iteration. Another CDN than the one that has failed to provide the segment is likely to be drawn and will then be required by the client device 1 to provide the same segment.

Furthermore, the repetition of step 100 implies that several score calculations are performed over time for a given CDN. Preferably, a single score variable is allocated in memory for a given CDN. Upon a new implementation of step 100, each score is updated. Thus, the score of each CDN changes over time. The quality score of a CDN can decrease or increase, which has obviously an influence on the subsequent random draw.

The client device 1 can send to the aggregation server 8 information indicative of a quality of transmission of data segments to this client device 1, from either of the CDNs (step 110). This information may comprise at least one of the following data associated with a given CDN:
- the scores calculated for this CDN during an implementation of step 100,
- a heuristic calculated for this CDN during an implementation of step 106 (bandwidth and/or transmission error heuristic), this information being more granular than the score,
- the number and/or the size of segments of the set of data which have been successfully downloaded by the client device 1 from the CDN, the number and/or the size of segment download errors encountered by the client device 1 by requiring the CDN, this information being even more granular than the heuristics,
- information making it possible to identify the sets of data to which the downloaded segments belong.

However, it is not necessary for the client device 1 to implement this step of sending information 110 to the aggregation server at each iteration. It can also be provided to trigger step 110 asynchronously with respect to the other steps represented in FIG. 2. In practice, it can be provided to aggregate the most granular information on the client side and send them to the aggregation server 8 periodically.

The method ends once all the segments of the set of data have been received by the client device 1 and processed by the latter.

How the scores associated with the different CDNs are calculated during the method in different situations will now be detailed. These situations depend on the considered iteration and on the question of whether these CDNS have already been required by the client device 1.

Initialization of the Scores

During the calculation step 100 of the very first iteration of the method, the scores of the different CDNs are initialized to initial values.

These initial values are for example equal, in which case the CDNs will all have the same chances of being drawn during the random draw 102 implemented during the first iteration.

As a variant, these initial values are different and proportional to respective weights associated with these different CDNs.

The initial values can be determined autonomously by the client device 1. They are for example stored in advance in the memory 4.

However, in a particularly advantageous embodiment, the aggregation server 8 provides the client device 1 with information that allows defining the initial values of the scores associated with the different CDNs.

In this embodiment, the initial values provided by the aggregation server 8 to the client device 1 are a function of information having been previously reported by at least one third-party device having implemented the same method as the client device 1 (it was indeed previously seen that the client device 1 itself sends all or part of the scores it calculates to the aggregation server 8 during step 110).

It could be envisaged that the aggregation server 8 directly provides the initial value of the score of a CDN of index i to the client device 1. In this case, the aggregation server 8 aggregates the information it receives from at least one third-party device such as 1*a* or 1*b*, and which relates to the CDN of index i.

However, it is preferable that the aggregation server 8 provides the client device with more granular information than scores, for example the heuristics discussed above. In this case, the heuristics managed by the device 1 are themselves initialized to the values received from the aggregation server 8. These initial heuristic values then make it possible to calculate the initial values of the scores during the first implementation of the calculation step 100. In other words, in this embodiment, the calculation step 100 is implemented in the same way in the first iteration and in the subsequent iterations.

Furthermore, it is preferable to apply some advantageous filters on the information provided by the aggregation server 8 to the client device 1. Thus, the aggregated information may comprise only the following information:
- the information relating to a sliding window of predetermined duration, in order to only consider recent measurements,
- the information reported only by third-party devices selected according to a network proximity criterion with the client device 1 (same ISP, same country, even same city, or even same ASN).
- the information concerning the same broadcaster: indeed, TF1 and M6 users do not necessarily obtain the same performances for the same CDN. Indeed, each CDN has several subnets of more or less efficient servers.
- the information relate to the same set of data as the one that must be processed by the device 1: Indeed, a popular content will be hidden on many servers of the CDN, while an unpopular content may not be hidden at all. This can have a significant impact on the performance of a CDN.

Requiring the aggregation server 8 allows initializing the scores to more relevant initial values. Consequently, the method will be more effective in obtaining and processing the first segments of the considered set of data.

Once the first iteration is complete, all the scores have indeed a value (an initial value), and one of the CDNs was drawn on the basis of its initial value, then required so that the device obtains a first segment of the set of data. However, all the other CDNs (numbering N−1) have not yet been required by the client device 1 for obtaining a segment of the set of data.

Update of the Score of a CDN that has Already been Required

Suppose now that the CDN of index i was required by the client device 1 during at least a previous iteration. In the following, the term "required" implicitly refers to the requirement step 104 and to the set of data discussed so far. In other words, a "required" CDN was therefore drawn randomly at least once during an implementation of step 102 and has provided at least one segment of the considered set of data to the client device 1. The assessment step 106 has therefore been implemented at least once for this CDN of index i, for at least one segment previously transmitted by the CDN of index i and received by the client device 1.

A new segment of the set of data, called reference segment, must now be obtained by the client device 1 with a view to processing it in a new iteration, called current iteration.

Since the current iteration is not the first iteration, a value has already been determined for the score $x_i$ during the calculation step 100 of an iteration preceding the current iteration.

During step 100 of the current iteration, the processing unit 6 updates the score $x_i$ as a function of at least one heuristic (bandwidth heuristic and/or error heuristic) associated with the CDN of index i and previously calculated. In this way, the new score $x_i$ takes into account the conditions under which the client device 1 has already received segments of the CDN of index i.

Update of the Score of a CDN that has not Yet been Required

A question arises as to how to update, during step 100 of a current iteration, the score of a CDN that has not yet been required. Indeed, this CDN has not yet transmitted a segment of the set of data to the client device.

One possibility is simply not to update the score of a CDN that has not yet been required. In such an embodiment, the value of the score of a CDN remains at its initial value until this CDN is required.

However, this has the drawback of creating potentially large gaps between the scores of the CDNs that have already been required and the scores of CDNs that have not yet been required by the client device 1. Such gaps are likely to unfairly penalize the CDNs that have not yet been required during a random draw 104.

The appearance of such gaps can occur when the client device 1 receives initial heuristic values which depend on heuristics calculated by third-party devices benefiting from a quality of communication with CDNs very different from the one seen by the client device 1. Assuming for example that the client device 1 benefits from a good connection to the CDNs (by optical fiber for example) while the third-party devices 1*a*, 1*b* benefit from a less efficient connection to these CDNs (ADSL for example). If the client device 1 initializes its own heuristics to values dependent on heuristic values reported by the third-party devices 1*a* or 1*b*, these initial heuristic values (and consequently the initial score values calculated on their basis by the client device 1) will poorly reflect the real conditions of communication between the CDNs and the client device 1. This is why an update of a heuristic associated with a CDN by the client device may reveal a significant gap between the heuristic value resulting from this update and the heuristics of other CDNS remained at their initial value.

To avoid this side effect, it is preferable, during the step of calculating the score 100 of a current iteration different from the first iteration, to update the score of a CDN that has not yet been required according to the score updated for at least one CDN having already been drawn during a previous iteration.

For example, assuming that a CDN of index i was drawn during the iteration preceding the current iteration. During the current iteration, the score of the CDN of index i is updated by the processing unit 6 using previously assessed heuristics, as indicated above. This update varies the value of the score of the CDN of index i by a certain factor (equal to the ratio between the score after update and the score before update).

The processing unit 6 calculates an update factor of a CDN of index j that has not yet been required, from the update factor of the CDN of index i. For example, the update factor calculated for the CDN of index j, that has not yet been required, is proportional to the update factor of the CDN of index i that has already been required. As a variant, the update factor calculated for the CDN of index j that has not yet been required, is proportional to an average of the respective update factors of several CDNs that have already been required, for example all the CDNs that have already been required to obtain segments of the set of data.

Then, the processing unit 6 updates the score of the CDN of index j by multiplying its current value by the update factor that has just been calculated for the CDN of index j.

Although it is interesting to avoid unjustified large score gaps, it is preferable to limit in time this mechanism for aligning scores of CDNs that have not yet been required on scores of CDNs that have already been required. For this, it is advantageous to vary the update factor calculated for a CDN that has not yet been required with the index of the current iteration and/or of the total number of segments already obtained by the client device 1, so as to bring the update factor closer to 1. Thus, the alignment effect caused by the update factor of a CDN that has not yet been required decreases over time.

Update of the Heuristics

The random drawing 102 and requirement 104 steps described above in relation to FIG. 2 are implemented during any current iteration.

Furthermore, during the step of assessing 106 a current iteration different from the first iteration, the unit updates the existing heuristics associated with the CDN having been drawn during the step of randomly drawing the current iteration, so that these heuristics take into account the conditions under which the reference segment has been received during the step of requiring 104 the current iteration of the drawn CDN.

Thus, the bandwidth heuristic updated during the current iteration takes into account the instantaneous bandwidth which was used during the reception of the reference segment, but also the instantaneous pass band which was used during each other segment of the set of data, previously transmitted by the CDN of index i during previous iterations.

Preferably, the bandwidth heuristic is calculated as an exponential weighted moving average (EWMA). In this way, it is ensured that the bandwidth heuristic gives more weight to a recently received segment than a segment previously received.

In addition, the transmission error heuristic is updated during the current iteration so as to change according to some advantageous rules.

If the CDN drawn during the current iteration has failed to transmit the reference segment to the client device 1 during the step of requiring 104 the current iteration, the error heuristic associated with the drawn CDN is updated so as to decrease the probability of the random draw of this CDN during a subsequent iteration of the method. For example, the error heuristic is updated in this case so as to decrease the value of the score of this CDN during a next implementation of step 100.

Conversely, if the CDN drawn during the current iteration has succeeded in transmitting the reference segment to the client device 1 during the step of requiring 104 the current iteration, the error heuristic associated with the drawn CDN is updated so as to enhance the probability of the random draw of this CDN during a next iteration of the method. For example, the error heuristic is updated in this case so as to increase the value of the score of this CDN during a next implementation of step 100.

In addition, the error heuristic of the network drawn during the current iteration varies by an amount which in turn increases with a number of errors in the transmission of past segments associated with this network. This mechanism thus increasingly sanctions a CDN accumulating errors in the transmission of segments.

The error heuristic associated with the other CDNs (that is, those that were not drawn during the current iteration) can also be updated under the following terms.

The processing unit 6 determines when the CDN not drawn during the current iteration was required for the last time. To determine this, the unit can count time, or count a number of segments or iterations of the method.

If the processing unit 6 realizes that a CDN of index i not drawn during the current iteration has not been drawn in a given period of time (for example, the last K segments received come from other CDNs than the CDN of index i, or no segment has been received from the CDN of index i from X seconds), the error heuristic of this CDN of index i is updated so to enhance the probability of the random draw of the network of index i during a next iteration of the method. This mechanism ultimately amounts to establishing a prescription principle: it is accepted that a CDN that has not been sanctioned for a sufficiently long period is more likely to be required in the future, even if this CDN had been sanctioned before this period.

All the principles mentioned above can be implemented in very different ways.

As an example, the insert below illustrates the pseudo-code of a possible embodiment of the steps of calculating the scores, probabilities and heuristics mentioned above.

```
HANDICAP_BASE = 10
ERROR_PERCENTAGE_BASE = 10
CAUTIOUSNESS in [0, +Inf[
ALPHA in ]0, 1] # bandwidth smoothing EWMA factor
BETA in ]0, 1] # error rate estimation EWMA factor
GAMMA in ]0, 1[ # handicap exponential decrease
for each CDN:
   score = weight * bandwidth/HANDICAP_BASE ^ hpw
   probability = score ^ CAUTIOUSNESS
   on success:
      // EWMA for bandwidth smoothing
      bandwidth = (1 - ALPHA) * bandwidth + ALPHA *
      measured_bandwidth
      // EWMA for error rate estimation
      error_rate = (1 - BETA) * error_rate
   on error:
      hpw = Min(100, hpw + ERROR_PERCENTAGE_BASE ^
      (error_rate * 100))
      // EWMA for error rate estimation
      error_rate = (1 - BETA) * error_rate + BETA
   on tick:
      // hpw multiplicative decrease with time
      hpw = (1. - GAMMA) * hpw
```

Here are some explanations on this exemplary pseudo-code, which comprises a loop that iterates over each CDN:
The branch on error is executed during a segment transmission error by the CDN to the client device 1.
The branch on success is executed when the device 1 successfully receives a segment of the CDN.
The variable measured_bandwidth is the instantaneous bandwidth measured for the last segment received by the client device 1 of the considered CDN.
The bandwidth heuristic associated with a CDN is here the variable bandwidth. As can be seen, the score calculated for a CDN depends on this variable. This bandwidth heuristic is revised upward if measured_bandwidth>bandwidth; otherwise, it is revised downward.
The error heuristic associated with a CDN corresponds here to the term HANDICAP_BASE raised to the power hpw. The value hpw is increased when the client device 1 detects a segment transmission error originating from the considered CDN, and this increase is in turn increasing with the term error_rate (see the term ERROR_PERCENTAGE_BASE raised to the power error_rate in case of passage in the branch on error).
The branch on tick corresponds to the prescription principle mentioned above: it is executed upon expiry of a counter. In practice, this branch is executed periodically for each CDN. At each passage, the value hpw associated with a given CDN is reduced, for example by 1% every second if GAMMA equals 0.01.
The predefined weight for a given CDN is the data weight.
The variable probability does not correspond directly to a probability Pi previously discussed (of a value comprised between 0 and 1). To obtain this probability, it is for example possible to divide this value by the sum of the variables probability of all the CDNs.

To take a concrete example, if for example just before an error, hpw equals 0, and error_rate equals 0.01, the (constant) parameter BETA equals 0.1, and HANDICAP_BASE and ERROR_PERCENTAGE_BASE equal 10. At the next iteration, hpw will be updated and will equal 10^1=10 (furthermore error_rate will equal (1−0.1)*0.01+0.1=0.109 after having been updated). The final score is obtained with the formula: score=weight*bandwidth/HANDICAP_BASE^hpw. Therefore in this example, the denominator will equal 10^10.

The invention claimed is:
1. A method for obtaining a data segment by a client device capable of communicating with a plurality of content delivery networks, the method comprising steps of:
for each network of the plurality of networks, calculating a score associated with the network indicative of a quality of transmission of data from the network to the client device, wherein the score is based on a transmission error heuristic, and wherein transmission error is measured at one of a session layer or an application layer,
randomly drawing a network in the plurality of networks, the random draw being adapted so that a probability of drawing a network of the plurality associated with a score indicative of a first quality of transmission is higher than a probability of drawing a network of the plurality associated with a score indicative of a second quality of transmission lower than the first quality of transmission, and
requiring the drawn network for the client device to obtain the data segment from the drawn network.

2. The method according to claim 1, wherein the random draw depends on a parameter, the random draw being adapted to:
increase the probability of drawing the network associated with the highest score among all the scores calculated relative to the probabilities of drawing the other networks of the plurality, when the value of the parameter varies in a first direction, and/or
decrease the probability of drawing the network associated with the highest score among all the scores calculated relative to the probabilities of drawing the other networks of the plurality, when the value of the parameter varies in a second direction opposite to the first direction.

3. The method according to claim 2, further comprises steps of
assessing a risk of deterioration of the conditions for processing, by the client device, a set of data comprising the data segment, such as conditions for playing, by the client device, a multimedia stream comprising the data segment,
modifying the value of the parameter according to the assessed risk of deterioration.

4. The method according to claim 1, wherein at least two networks of the plurality, even all the networks of the plurality, have non-zero probabilities of being drawn.

5. The method according to claim 1, wherein the score calculation, random drawing and requirement steps are repeated for several data segments belonging to a set of data such as a multimedia stream or a file.

6. The method according to claim 1, wherein the data segment belongs to a set of data, and wherein the scores are initialized to initial values before the device obtains any segment of the set of data, the initial value of the score of a network of the plurality being determined based on information indicative of a quality of transmission of data segments from the same network to at least a third-party device different from the client device, the information being provided to the client device by an aggregation server capable of communicating with each third-party device.

7. The method according to claim 1, wherein if a first network of the plurality has already been required by the client device to obtain at least one data segment belonging to the set of data from the initialization, the score of this first network is updated by taking into account the effective quality of transmission of at least one segment transmitted by the first network to the client device.

8. The method according to claim 7, wherein if, moreover, a second network of the plurality has not yet been required by the client device to obtain a data segment belonging to the set of data from the initialization, the score of this second network is updated by taking into account the value of the score of the first network.

9. The method according to claim 1, comprising the calculation of a bandwidth heuristic indicative of a bandwidth available for the transmission of data segments by a network of the plurality to the client device, the score associated with this network depending on the calculated bandwidth heuristic.

10. The method according to claim 1, the transmission error heuristic being indicative of errors in the transmission of data segments having previously been requested by the client device from the network.

11. The method according to claim 10, wherein the transmission error heuristic associated with a network of the plurality varies so as to decrease the probability of the random draw of the network, when the network fails to transmit a data segment to the client device.

12. The method according to claim 11, wherein the transmission error heuristic associated with a network of plurality varies by an amount which in turn increases with a number of past errors in the transmission of segments associated with this network.

13. The method according to claim 10, wherein the transmission error heuristic associated with a network varies so as to enhance the probability of the random draw of the network, when the network success in transmitting a data segment to the client device.

14. The method according to claim 10, wherein the transmission error heuristic of a network varies so as to enhance the probability of the random draw of the network, when no data segment is transmitted from the network to the client device within a predetermined period of time.

15. The method according to claim 1, wherein the score associated with a network depends on a predefined weight specific to this network.

16. A method for playing, by a client device, a multimedia stream comprising a plurality of data segments, the method comprising obtaining at least one of the data segments by means of the method according to claim 1.

17. A computer program product comprising program code instructions stored in a non-transitory computer readable medium for controlling the execution of the steps of the method according to claim 1, when this program is executed by a processing unit.

18. A non-transitory medium readable by a client device on which is stored a computer program comprising program code instructions executed by a processor for executing the steps of the method according to claim 1.

19. A client device comprising a communication interface for communicating with a plurality of content delivery networks, and a processing unit configured to control the implementation of the steps of the method according to claim 1.

* * * * *